United States Patent
Bychkov et al.

(10) Patent No.: US 7,997,914 B2
(45) Date of Patent: Aug. 16, 2011

(54) PUSH-TO-INSERT, PUSH-TO-EJECT AND PULL-TO-EXTRACT CARD CONNECTOR

(75) Inventors: Eyal Bychkov, Hod Hasharon (IL); Yaniv Maydar, Tel Aviv (IL); Noam Bernstein, Tel Aviv (IL); Itay Cohen, Raanana (IL)

(73) Assignee: Google Inc., Mountain View, CA (US)

( * ) Notice: Subject to any disclaimer, the term of this patent is extended or adjusted under 35 U.S.C. 154(b) by 79 days.

(21) Appl. No.: 12/481,632

(22) Filed: Jun. 10, 2009

(65) Prior Publication Data
US 2009/0311903 A1    Dec. 17, 2009

Related U.S. Application Data

(60) Provisional application No. 61/060,522, filed on Jun. 11, 2008.

(51) Int. Cl.
*H01R 13/62* (2006.01)
(52) U.S. Cl. .......................................... 439/159
(58) Field of Classification Search .................. 439/159, 439/155, 923
See application file for complete search history.

(56) References Cited

U.S. PATENT DOCUMENTS

| | | | |
|---|---|---|---|
| 4,936,790 A | 6/1990 | De La Cruz | |
| 5,323,291 A | 6/1994 | Boyle et al. | |
| 5,548,484 A * | 8/1996 | Kantner | 361/737 |
| 5,625,673 A | 4/1997 | Grewe et al. | |
| 5,628,055 A | 5/1997 | Stein | |
| 5,809,115 A | 9/1998 | Inkinen | |
| 5,818,691 A * | 10/1998 | McMahan et al. | 361/679.43 |
| 5,893,037 A | 4/1999 | Reele et al. | |
| 5,907,815 A | 5/1999 | Grimm et al. | |
| 6,188,917 B1 | 2/2001 | Laureanti | |
| 6,201,867 B1 | 3/2001 | Koike | |
| 6,243,578 B1 | 6/2001 | Koike | |
| 6,477,357 B1 | 11/2002 | Cook | |
| 6,516,202 B1 | 2/2003 | Hawkins et al. | |
| 6,572,392 B2 * | 6/2003 | Motojima | 439/159 |
| 6,640,113 B1 | 10/2003 | Shim et al. | |
| 6,690,947 B1 | 2/2004 | Tom | |
| 6,898,283 B2 | 5/2005 | Wycherley et al. | |
| 6,907,264 B1 | 6/2005 | Sterkel | |
| 6,948,956 B2 * | 9/2005 | Ngo | 439/155 |

(Continued)

FOREIGN PATENT DOCUMENTS
EP    1871075 A1    12/2007
(Continued)

*Primary Examiner* — Neil Abrams
(74) *Attorney, Agent, or Firm* — Sequel Group LLC

(57) ABSTRACT

An assembly for a receptacle for an electrical connector plug, including a chassis for inserting an electrical connector plug therein, two slideable grooved latches mounted on two opposite side surfaces of the chassis, that slide along the two opposite sides under applied force, two springs fastened to respective ones of the two slideable latches, mounted on the two opposite side surfaces of the chassis, a bar mounted between the two slideable latches, and a receptacle for the connector plug, mounted on the bar and including a plurality of contact pins for electrical contact with the connector plug, wherein (i) when the connector plug is pushed into the receptacle, the two slideable latches are pushed away from respective ones of the two springs, causing the two springs to stretch and to exert tensions thereon, and (ii) when the connector plug is pushed a second time, the two slideable latches are released, causing the connector plug to be partially ejected from the receptacle.

13 Claims, 18 Drawing Sheets

U.S. PATENT DOCUMENTS

| | | |
|---|---|---|
| 6,999,792 B2 | 2/2006 | Warren |
| 7,018,222 B2 | 3/2006 | Chang |
| 7,085,542 B2 | 8/2006 | Dietrich et al. |
| 7,156,683 B2 * | 1/2007 | Gupta et al. ............... 439/352 |
| 7,194,285 B2 | 3/2007 | Tom |
| 7,266,391 B2 | 9/2007 | Warren |
| 7,300,295 B2 * | 11/2007 | Kimura et al. ............... 439/159 |
| 7,477,919 B2 | 1/2009 | Warren |
| 7,515,937 B2 | 4/2009 | Lee |
| 2002/0090980 A1 | 7/2002 | Wilcox et al. |
| 2002/0151327 A1 | 10/2002 | Levitt |
| 2004/0233930 A1 | 11/2004 | Colby, Jr. |
| 2004/0268005 A1 | 12/2004 | Dickie |
| 2005/0159184 A1 | 7/2005 | Kerner et al. |
| 2006/0003804 A1 | 1/2006 | Liu |
| 2006/0105722 A1 | 5/2006 | Kumar |
| 2006/0190321 A1 | 8/2006 | Martins Nicho et al. |
| 2006/0219776 A1 | 10/2006 | Finn |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0288583 A1 | 12/2007 | Rensin et al. |
| 2008/0009325 A1 | 1/2008 | Zinn et al. |
| 2008/0040354 A1 | 2/2008 | Ray et al. |
| 2008/0140886 A1 | 6/2008 | Izutsu |

FOREIGN PATENT DOCUMENTS

| | | |
|---|---|---|
| WO | 9421058 A1 | 9/1994 |
| WO | 0059247 A1 | 10/2000 |
| WO | 0186922 A1 | 11/2001 |
| WO | 03103174 A1 | 12/2003 |

* cited by examiner

PUSH-TO-INSERT, PUSH-TO-EJECT AND PULL-TO-EXTRACT CARD CONNECTOR

PRIORITY REFERENCE TO RELATED APPLICATIONS

This application claims benefit of U.S. Provisional Application No. 61/060,522, entitled PUSH-TO-INSERT, PUSH-TO-EJECT AND PULL-TO-EXTRACT CARD CONNECTOR, filed on Jun. 11, 2008 by inventors Eyal Bychkov, Yaniv Maydar, Noam Bernstein and Itay Cohen.

FIELD OF THE INVENTION

The field of the present invention is connectors for electronic devices.

BACKGROUND OF THE INVENTION

The feats of miniaturization are astounding. Given Imaging, Ltd. of Yoqneam, Israel, manufactures a miniature 11 mm×26 mm video camera that fits inside a pill that is swallowed by a patient. SanDisk Corporation of Milpitas, Calif., manufactures a 16 GB MicroSDHC card having physical dimensions 15 mm×11 mm×0.7 mm, which is the size of a fingernail. Western Digital Corporation of Lake Forest, Calif. now manufactures a 320 GB portable hard drive having physical dimensions 126 mm×79 mm×15 mm, which is the size of a passport, and weighs 180 g. Three of these passport drives together contain almost a terabyte of data, weigh slightly over half a kilogram, and can be held in the palm of one's hand.

Many difficult challenges are encountered when attempting to miniaturize devices, relating to electronic circuitry, power management, heat generation, mechanical structures, and more. Conventional electronic and mechanical components generally require specific amounts of space, and thus limit the ability to miniaturize. As such, miniaturization often involves developing new components and new designs. Reductions in size by as little as 1 mm are often breakthrough achievements in miniaturization.

As miniature electronic devices are often attached to larger devices, they require suitable connector plugs for connecting them to the larger devices. To make electrical connection, a connector plug is engaged with metal contact pins housed in a receptacle for the connector. Conventional receptacles have insert and eject mechanisms, for inserting a connector plug into a receptacle and for extracting the connector plug from the receptacle, respectively. However, the insert/eject mechanisms impose limitations on miniaturization, which is one of the challenges that must be overcome in order to reduce sizes of electronic devices.

One type of conventional receptacle, used for SD cards and memory sticks, uses as a "push-to-insert and push-to-eject" mechanism. An example of such a receptacle is the Pitch ExpressCard® Ejector, manufactured and distributed by Molex Incorporated of Lisle, Ill. For insertion, a user pushes the card/memory stick into a host device until it locks into its receptacle, and for extraction, the user again pushes the card/memory stick into the host device until the lock is released and the card/memory stick pops out. Such receptacles require that the card/memory stick has slack length to span movement of the card/memory stick beyond the locked position. Additionally, in order to enable sufficient force to fully extract the connector plugs from the contact pins of the receptacles, such receptacles generally have a flat pad structure to minimize the friction, resulting in the pad being exposed on the surface of the host device.

It would thus be of advantage to have connectors and receptacles that do not require conventional insert/eject mechanisms.

SUMMARY OF THE DESCRIPTION

Aspects of the present invention relate to miniaturization of connector plugs for electronic devices. When attempts are made to reduce electronic devices to miniature sizes, the small available space makes it impossible or impractical to use many of the conventional mechanical structures. Thus challenges arise in finding alternative structures that require less space.

Embodiments of the present invention address the challenge of designing connector plugs, used for attaching one electronic device to another. Conventional receptacles use insert and eject mechanisms that require slack space for pushing a connector plug into a receptacle beyond its locked position, and thus impose limitations on how small a connector plug may be.

Embodiments of the present invention overcome the need for slack length on a connector plug by introducing a movable receptacle for the connector plug. Whereas conventional receptacles are rigidly fixed to their chassis, the movable receptacle slides, or "floats" in its chassis. The movable receptacle has mechanical parts including a locking system, a flexible PCB, and a retractable mechanism. The movable receptacle is designed so as to have two stationary positions. After the receptacle is pushed for inserting a connector plug therein, the receptacle locks into a first stationary position. After the receptacle is pushed to extract the connector plug therefrom, the receptacle rests in a second stationary position. The connector plug is still attached to and in electrical contact with the receptacle when the receptacle is in the rest position; however, the device housing the connector plug protrudes sufficiently so that a person can grasp the device and pull it out, thereby disengaging the connector plug from the pins of the receptacle. Such a "push-to-insert, push-to-eject and pull-to-extract" mechanism enables use of shorter connector plugs, by avoiding the need for slack space on the connector plug side, and requiring slack space only for movement of the receptacle.

Embodiments of the present invention are of advantage to a wide variety of devices, including inter alia miniature devices, such as small memory cards and small communication cards, that are attached to larger devices, such as computers, cameras, cell phones and game stations. One embodiment of the present invention applies to a miniature wireless communicator that attaches to a container device that provides a user interface therefore.

There is thus provided in accordance with an embodiment of the present invention an assembly for a receptacle for an electrical connector plug, including a chassis for inserting an electrical connector plug therein, two slideable grooved latches mounted on two opposite sides of the chassis, that slide along the two opposite sides under applied force, two springs fastened to respective ones of the two slideable latches, mounted on the two opposite sides of the chassis, a bar mounted between the two slideable latches, and a receptacle for the connector plug, mounted on the bar and including a plurality of contact pins for electrical contact with the connector plug, wherein (i) the two slideable latches are pushed away from respective ones of the two springs, causing the two springs to stretch and to exert tensions thereon, when the connector plug is pushed into the receptacle, and (ii) the two slideable latches are pulled towards respective ones of the springs, when the connector plug is extracted from the receptacle.

There is additionally provided in accordance with an embodiment of the present invention an assembly for a receptacle for an electrical connector plug, including a chassis for sliding an electrical connector plug therein, two slideable latches mounted on two opposite sides of the chassis, that slide along the two opposite sides under applied force, a bar mounted between the two slideable latches, and a receptacle for the connector plug mounted on the bar, including a plurality of contact pins for making electrical contact with the connector plug, wherein (i) the slideable guides advance along the two opposite surfaces of the chassis when the connector plug is pushed into the chassis for insertion into the receptacle, and (ii) the slideable guides advance and then retract along the two opposite sides of the chassis when the connector plug is pushed into the chassis for extraction from the receptacle.

There is further provided in accordance with an embodiment of the present invention a system including a device including an electrical connector plug, and a container for the device including a housing with a cavity for inserting the device therein, two movable latches mounted in the housing, that move relative to the housing under applied force, a bar mounted between the two slideable latches, and a receptacle for the connector plug, mounted on the bar, including a plurality of contact pins for making electrical contact with the connector plug, wherein (i) the slideable latches advance to allow the device to sit fully within the cavity when the device is pushed into the container for insertion of the connector plug into the receptacle, and (ii) the slideable latches advance and retract such that the device extends out of the cavity and may be pulled for release from the receptacle when the device is pushed into the housing for extraction of the connector plug from the receptacle.

There is yet further provided in accordance with an embodiment of the present invention an assembly for a receptacle for an electrical connector plug, including a chassis, and a receptacle mounted within the chassis that moves relative to the chassis into a locked position in response to an electrical connector plug being pushed into the chassis for insertion into the receptacle, and that moves relative to the chassis into a rest position in response to the electrical connector plug being pushed into the chassis for extraction from the receptacle, wherein the rest position is different than the locked position relative to the chassis.

BRIEF DESCRIPTION OF THE DRAWINGS

The present invention will be more fully understood and appreciated from the following detailed description, taken in conjunction with the drawings in which.

DETAILED DESCRIPTION

Embodiments of the present invention relate to a miniature electrical connector plug for an electronic device, and a receptacle therefore. A miniature electrical connector plug is set into a surface of an electronic device, and a receptacle is mounted into a container chassis. Due to its small size, the miniature connector plug may not have the necessary slack length for use with a conventional push-push insert/eject mechanism, whereby the connector plug must be pushed into the chassis beyond its locked engaged position in order to fully disengage the connector plug with pins in the receptacle.

To overcome this limitation, embodiments of the present invention introduce a receptacle mounted on a slideable bar that has two stationary positions. The first stationary position, a locked position, is attained after the electronic device is pushed into the housing of the receptacle for insertion of the connector plug into the receptacle. The second stationary position, a rest position, is attained after the device is again pushed into the housing of the receptacle for extraction of the connector plug from the receptacle. When the bar is in the rest position the connector plug is still attached to and in electrical contact with the receptacle, but the miniature device extends outside out of the housing for the receptacle, enabling one to grasp and pull the device, and thereby free the connector plug from the receptacle.

It will be appreciated by those skilled in the art that embodiments of the present invention have widespread application to an unlimited variety of electronic devices that connect to one another; e.g., small communication cards that attach to computers, small memory cards that attach to cameras or to cell phones or game stations, and small cameras that attach to personal digital assistants (PDAs).

Figure 1:
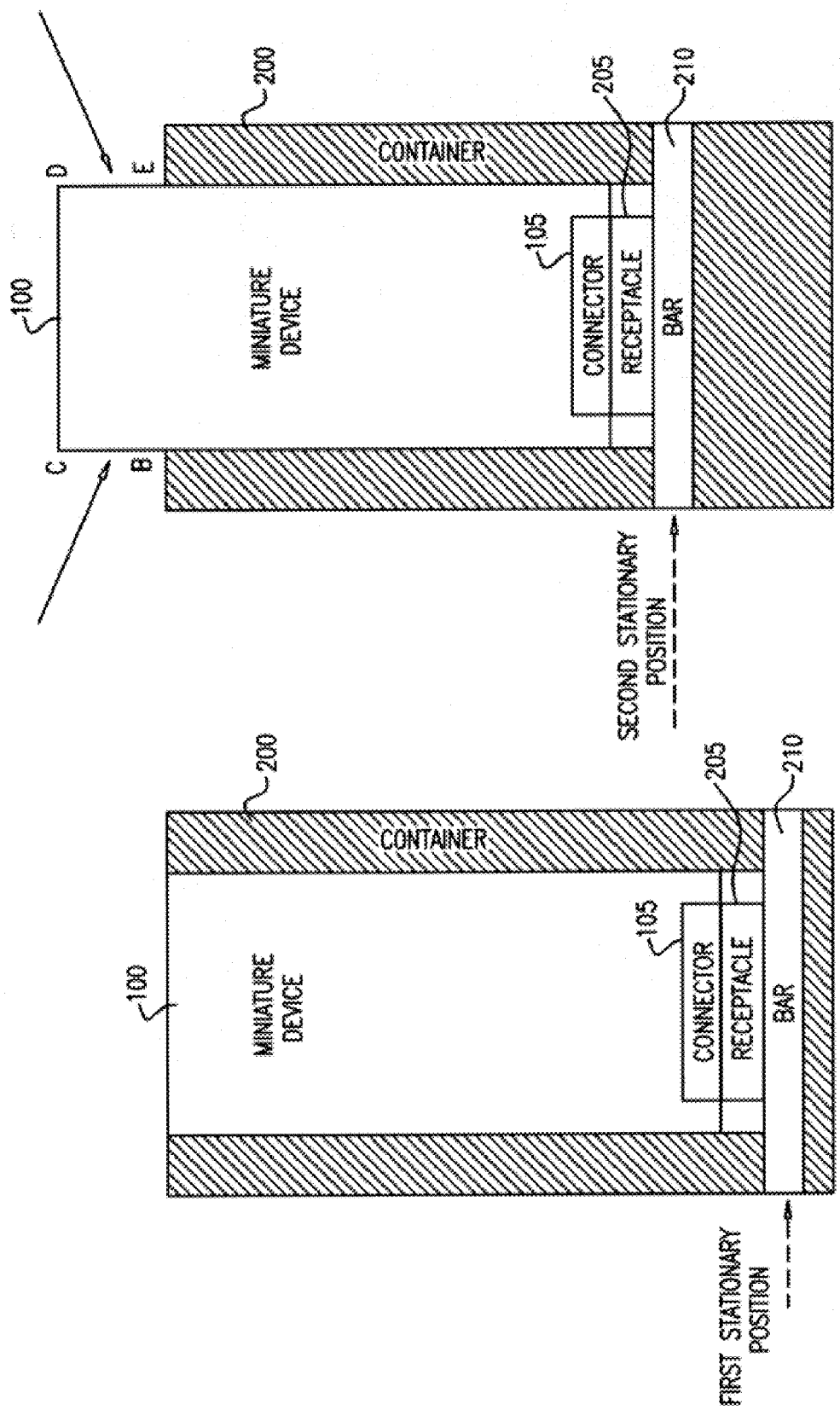
FIG. 1 is a simplified generic block diagram of a miniature device connected to a container, in accordance with an embodiment of the present invention.

Reference is made to FIG. 1, which is a simplified generic block diagram of a miniature device 100 connected to a container 200, in accordance with an embodiment of the present invention. Device 100 has a miniature connector plug 105, and container 200 has a receptacle 205 for connector plug 105. Device 100 may be inter alia a communication card, a memory card or a camera. Container 200 may be inter alia a computer, a camera, a cell phone, a game station or a PDA.

In an embodiment of the present invention, receptacle 205 is mounted on a slideable bar 210 inside of container 200, which has two stationary positions. When slideable bar 210 is in the first stationary position, a locked position, device 100 is substantially enclosed by container 200. When slideable bar 210 is in the second stationary position, a rest position, device 100 protrudes out of container 200. In the rest position, connector plug 105 is still engaged and in electrical contact with receptacle 205, and a person can grasp and pull device 100 to free connector plug 105 from receptacle 205, as indicated in FIG. 1. The portion of device 100 protruding out of container 200 is indicated by area BCDE in FIG. 1. For the embodiment of the present invention to modular wireless communicators described hereinbelow, the length BC is on the order of 8 mm, which is sufficient for grasping by a person. Mechanical structures for implementing slideable bar 210 and its chassis in container 200 are described in detail below with reference to FIGS. 9-16.

In one embodiment, the present invention applies to a small modular wireless communicator that attaches to container devices. There are two general types of container devices to which the wireless communicator may be attached; namely, "jackets" and "hosts". A jacket is a device that provides a user interface for the wireless communicator, enriches the capabilities of the wireless communicator, and is not able to operate independently when the wireless communicator is not connected thereto. A host is a device that is able to operate independently when the wireless communicator is not attached thereto, and whose capabilities are enriched by the wireless communicator when the wireless communicator is attached thereto. Generally a host does not have communication functionality independent of the wireless communicator.

Figure 2:
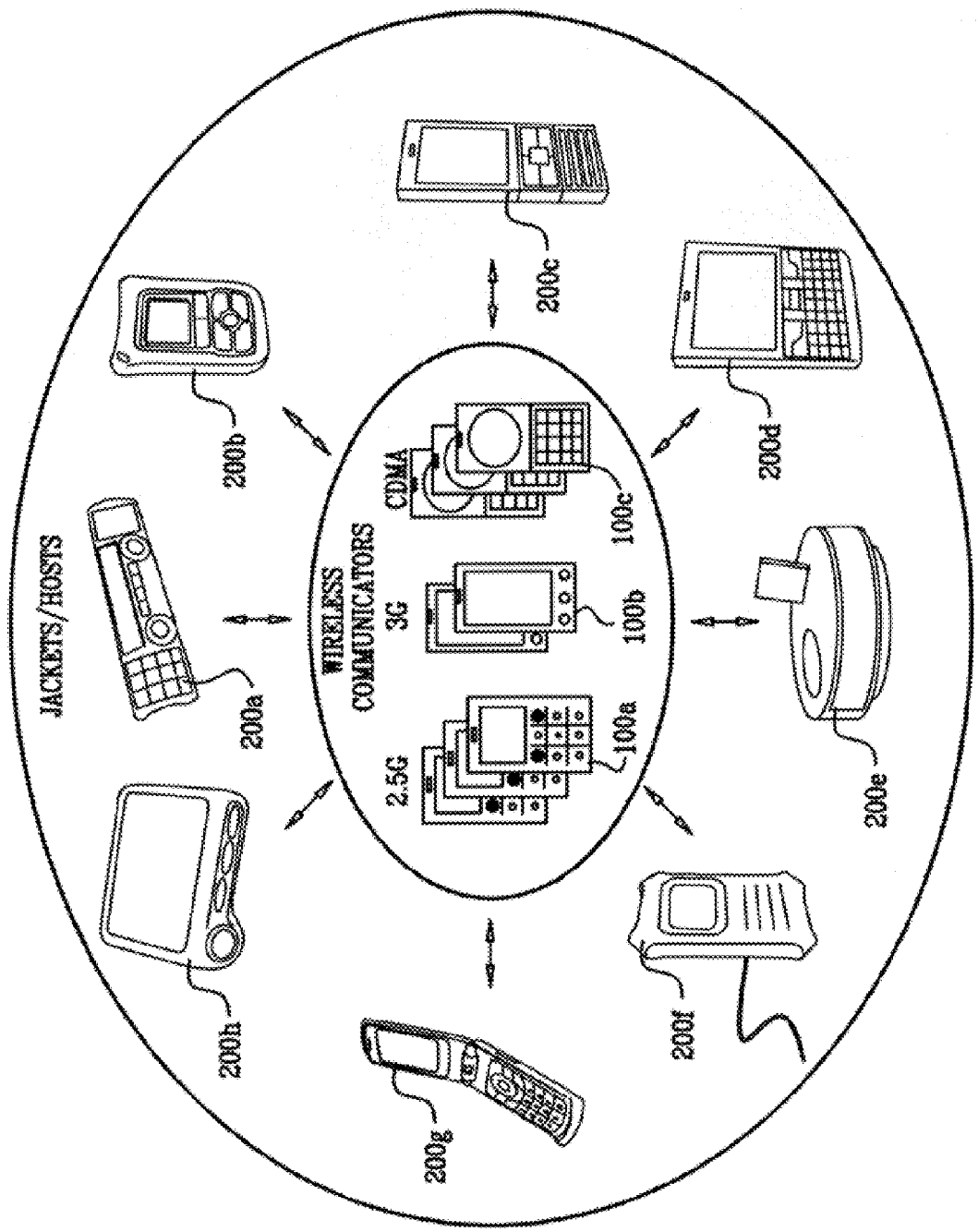
FIG. 2 is a simplified illustration of a communication system constructed and operative in accordance with an embodiment of the present invention.

Reference is made to FIG. 2, which is a simplified illustration of a communication system constructed and operative in accordance with an embodiment of the present invention. Shown in FIG. 2 are a variety of wireless communicators 100a-100c, including 2.5G communicators for a GSM network, 3G communicators for a GSM network, and CDMA communicators for a CDMA network. It will be appreciated by those skilled in the art that the networks illustrated in FIG. 2 are exemplary of a wide variety of networks and communication protocols that are supported by the wireless communicators of the present invention, such networks and communication protocols including inter alia WiFi, Bluetooth and WiMax.

Also shown in FIG. 2 are a variety of jackets and hosts 200a-200h. In accordance with an embodiment of the present invention, each wireless communicator 100a-100c may be attached to any of the jackets and hosts 200a-200h, so as to operate in combination therewith. The wireless communicators 100a-100c are substantially of the same form factor and, as such, are able to be attached to the various jackets and hosts 200a-200h.

Figure 3:
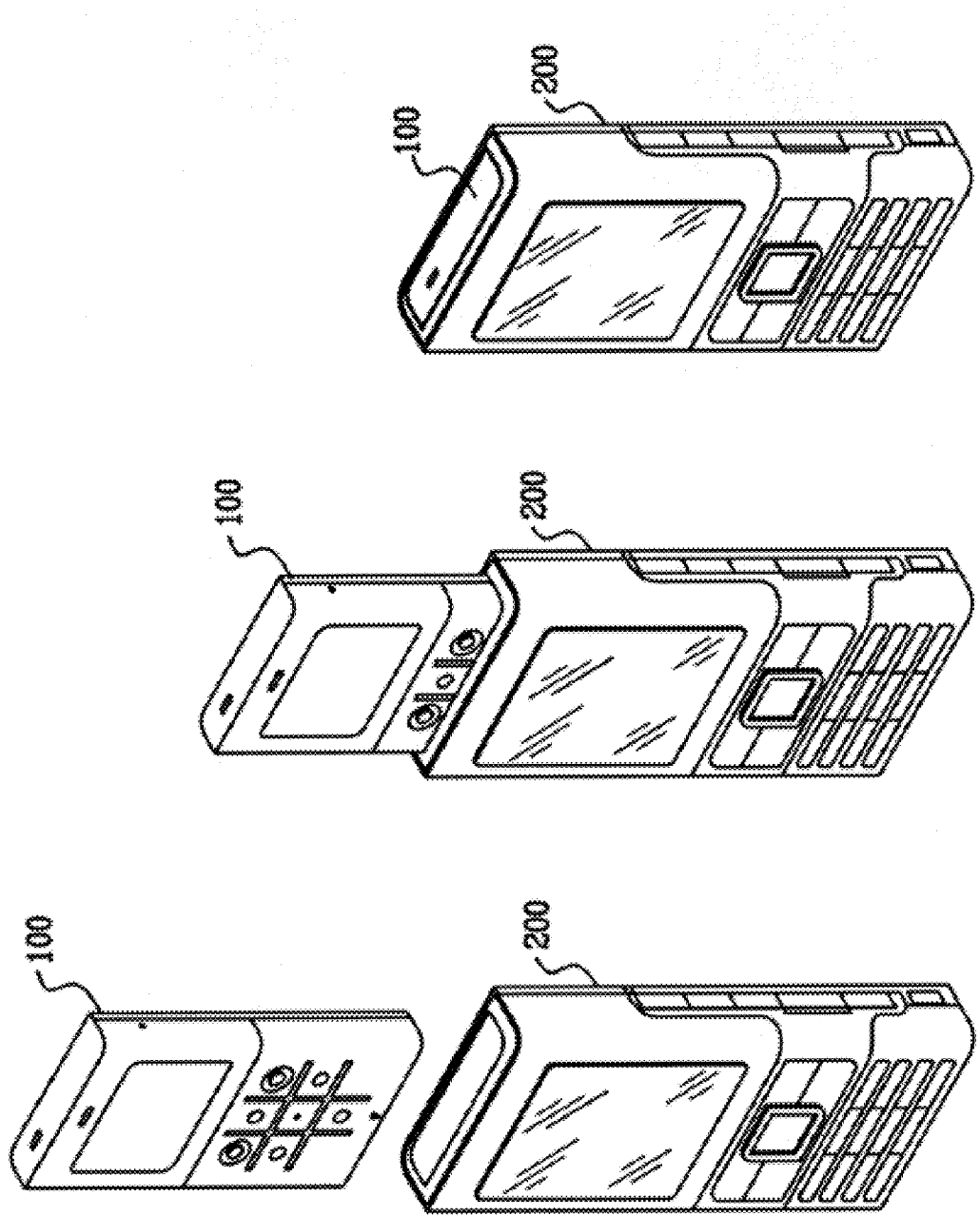
FIG. 3 is an illustration of a miniature wireless communicator being inserted into a jacket or host, in accordance with an embodiment of the present invention.

Reference is made to FIG. 3, which is an illustration of a miniature wireless communicator 100 being inserted into a jacket or host 200, in accordance with an embodiment of the present invention. Jacket or host 200 as shown in FIG. 3 includes a hollow cavity at the top for insertion of wireless communicator 100 therein.

Figure 4A:
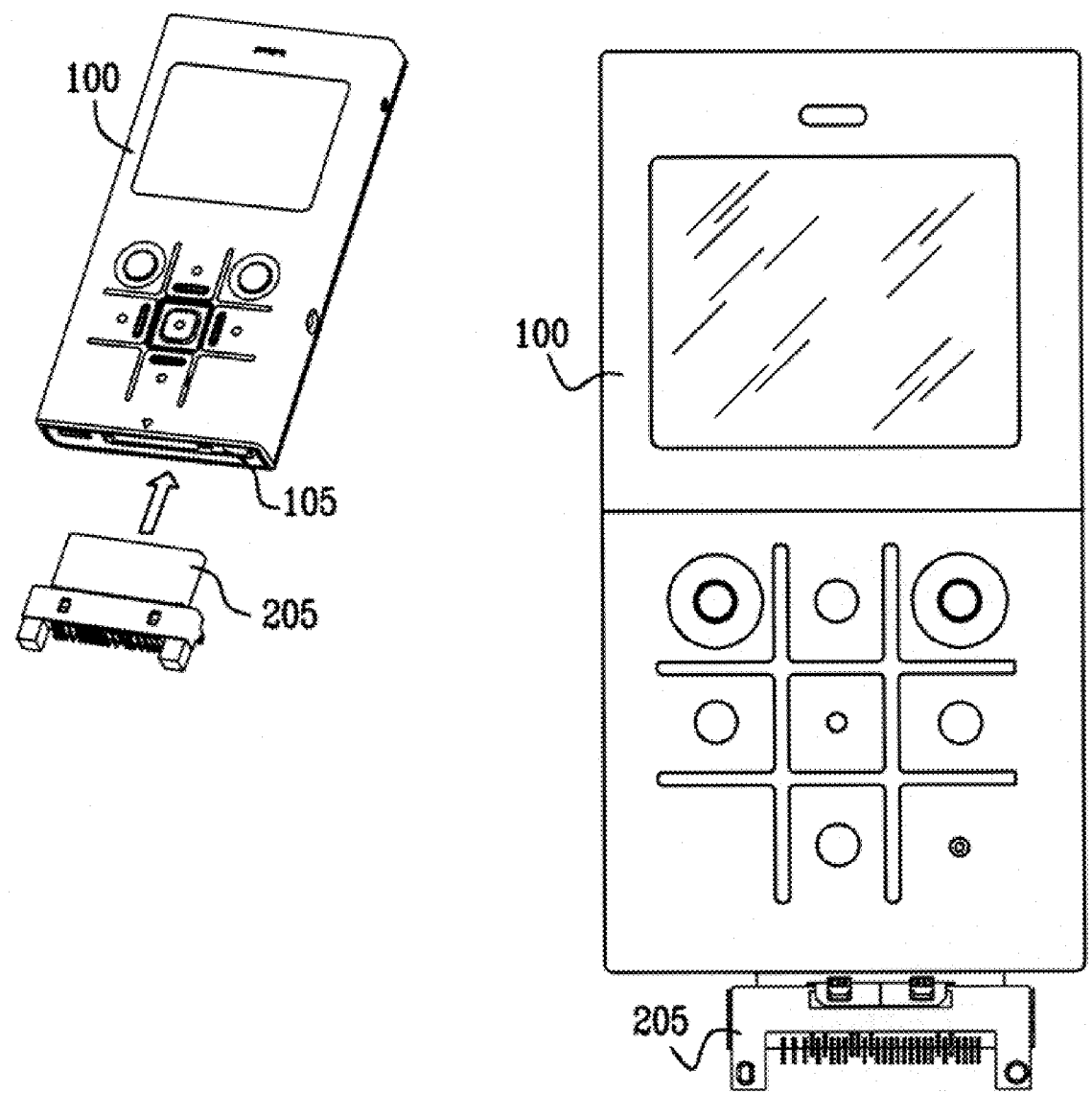
FIGS. 4A and 4B are mechanical drawings of an embodiment of a miniature wireless communicator in accordance with an embodiment of the present invention.
Figure 4B:
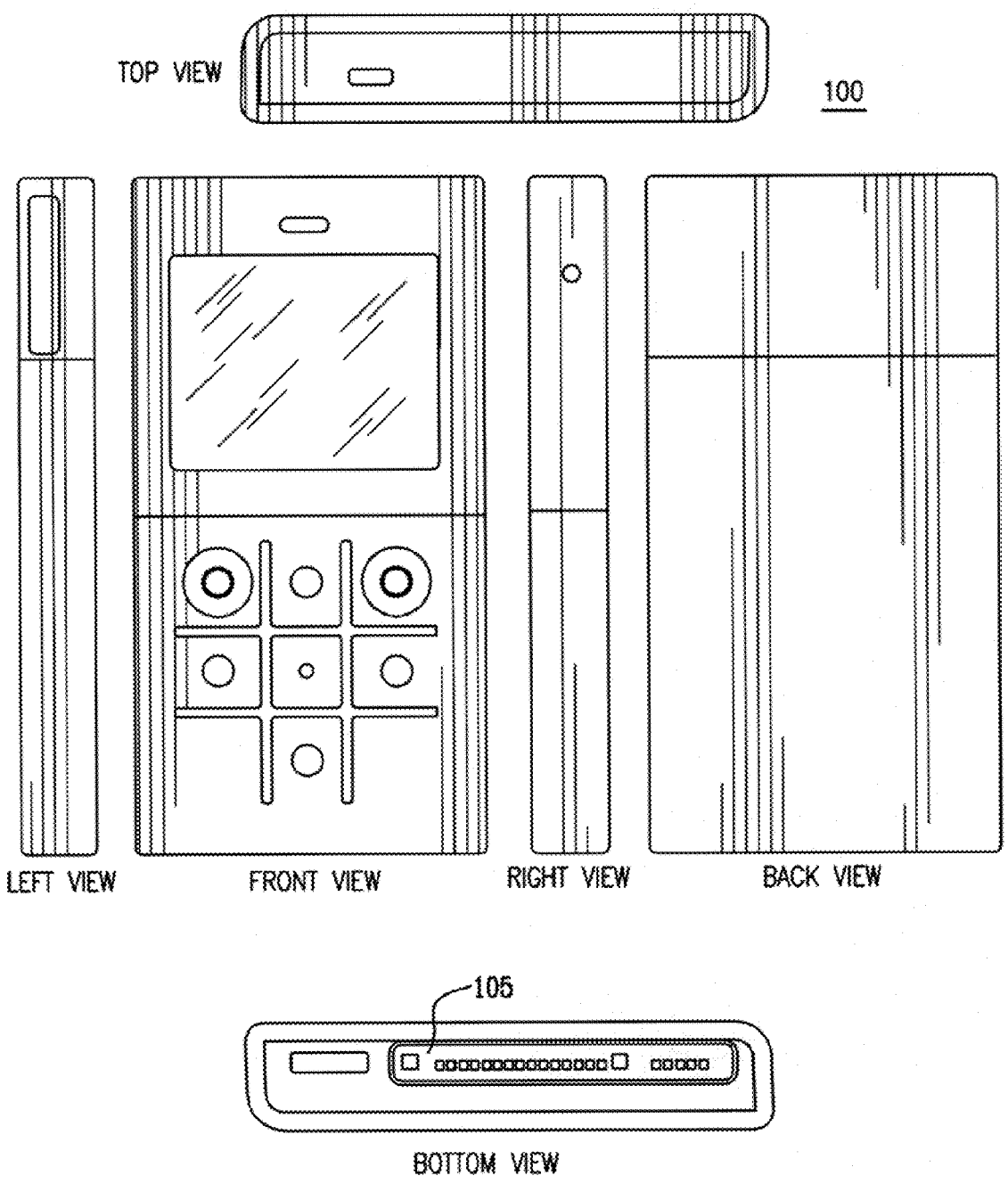

Reference is made to FIGS. 4A and 4B, which are mechanical drawings of an embodiment of wireless communicator 100 in accordance with an embodiment of the present invention. Wireless communicator 100 is miniature; in one embodiment, its dimensions are approximately 72 mm×38 mm×8 mm. Use of the present invention achieves a reduction in length of wireless communicator 100, on the order of 3 mm or more. Those skilled in the art will appreciate that the present invention is of advantage when wireless communicator 100 is manufactured with other dimensions, as well.

Figure 5:
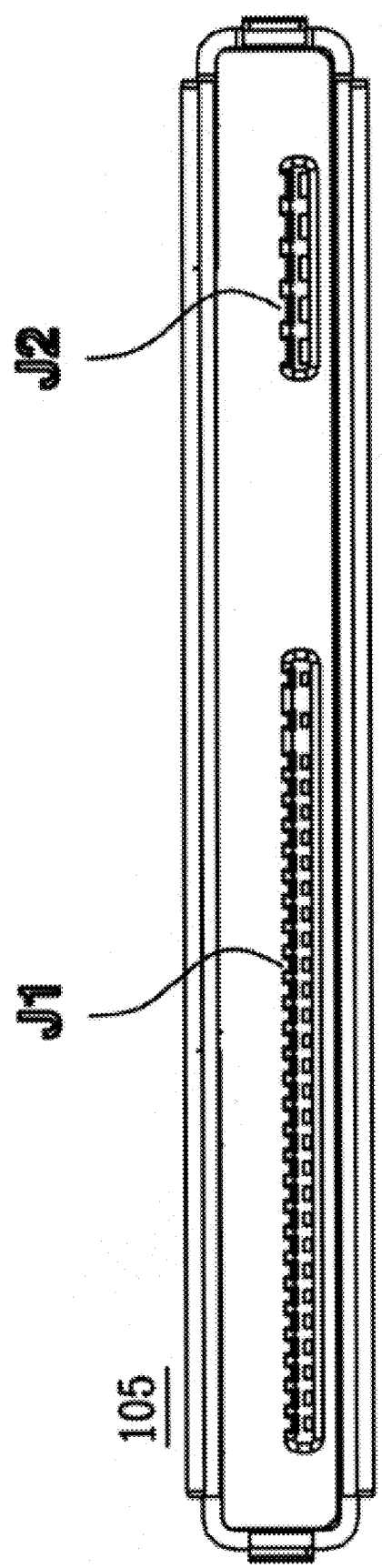
FIG. 5 is an illustration of a miniature connector plug, in accordance with an embodiment of the present invention.

As shown in FIGS. 4A and 4B, wireless communicator 100 includes miniature connector plug 105, which attaches to receptacle 205. Reference is made to FIG. 5, which is an illustration of connector plug 105, in accordance with an embodiment of the present invention. The specific connector plug shown in FIG. 5 includes a 24-pin proprietary connector, labeled J1, and also includes a 5-pin mini-USB connector, labeled J2.

Figure 6A:
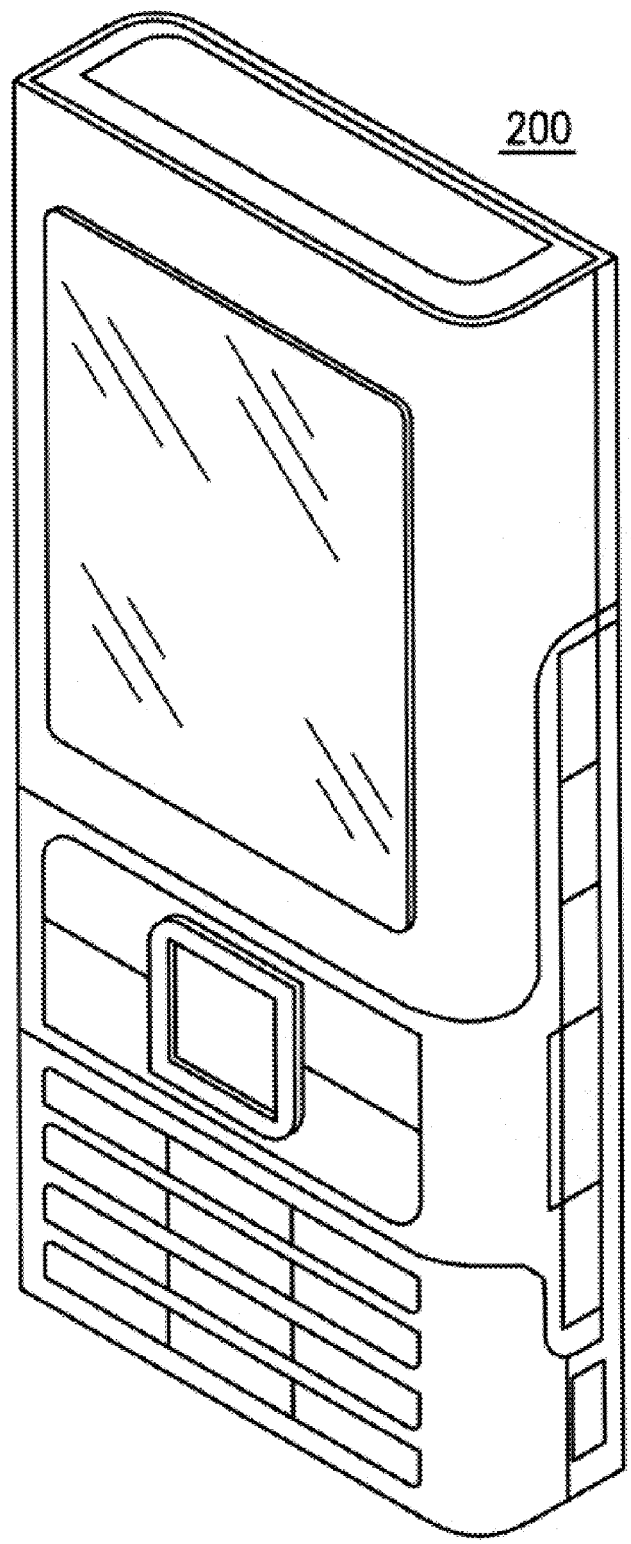
FIGS. 6A and 6B are mechanical drawings of an embodiment of a jacket or host in accordance with an embodiment of the present invention.
Figure 6B:
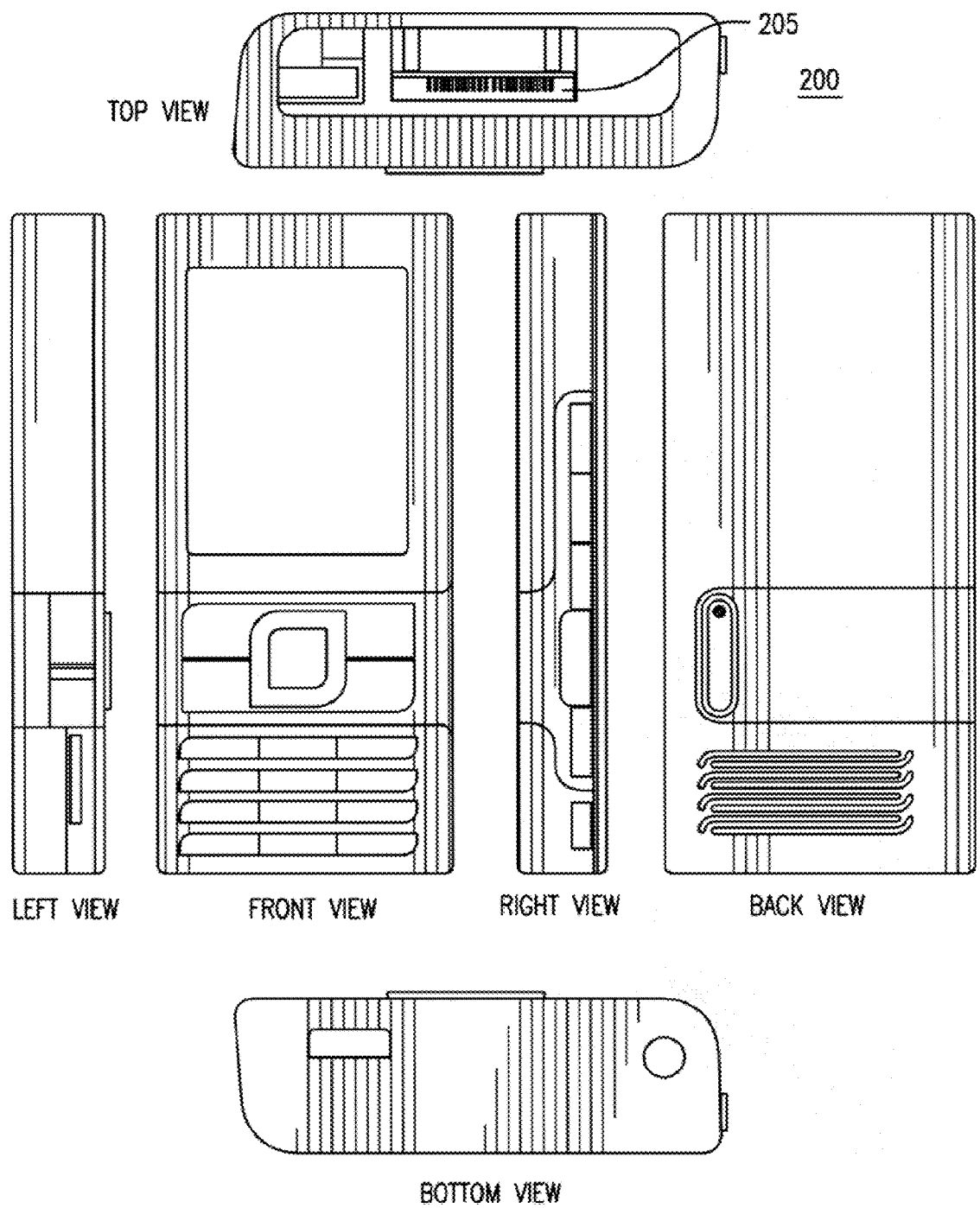

Reference is made to FIGS. 6A and 6B, which are mechanical drawings of an embodiment of a jacket or host 200 in accordance with an embodiment of the present invention.

Figure 7:
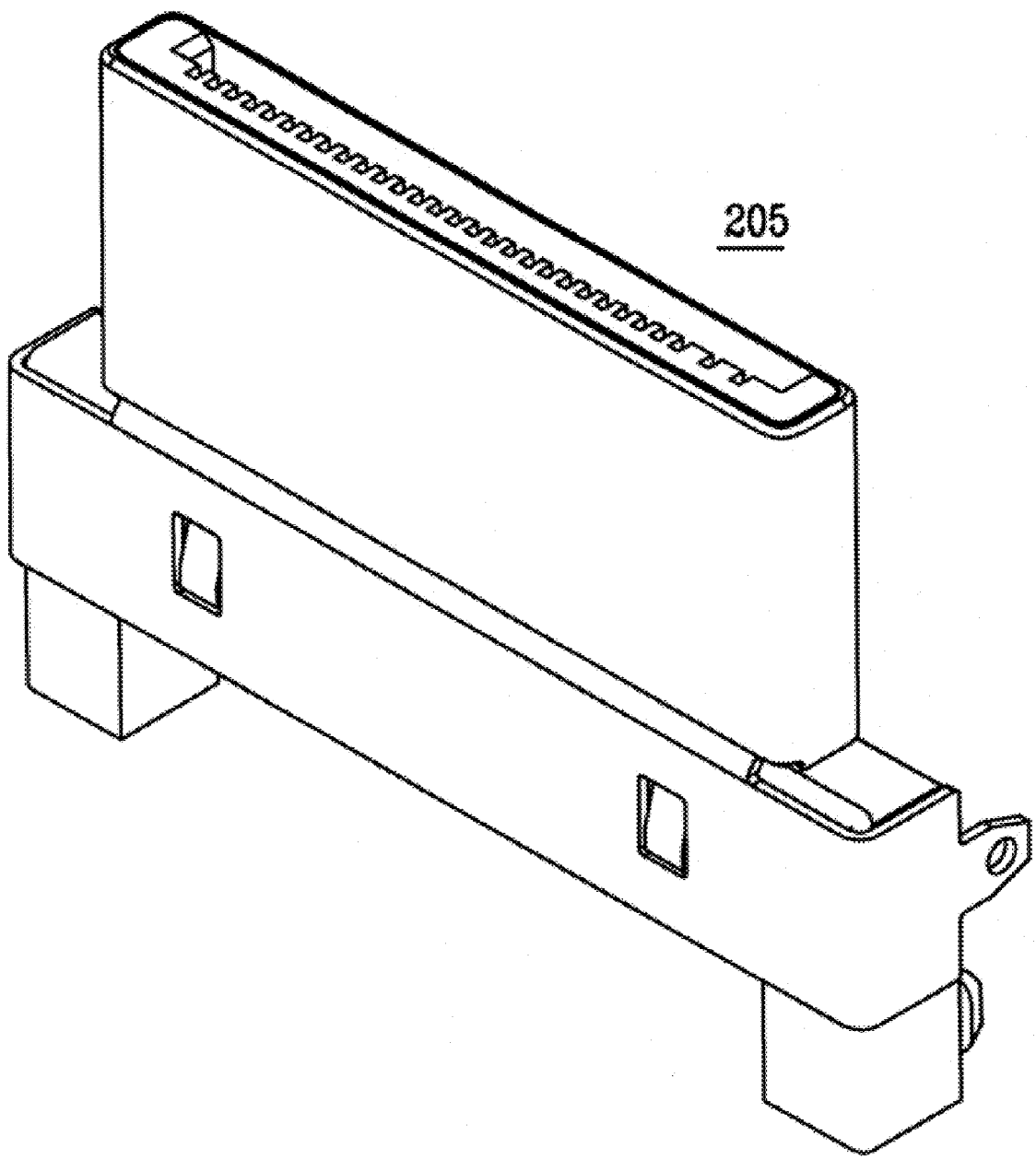
FIG. 7 is an illustration of a miniature receptacle, in accordance with an embodiment of the present invention.

As shown in FIG. 6B, jacket or host 200 includes miniature receptacle 205 for connector plug 105. Reference is made to FIG. 7, which is an illustration of receptacle 205 and its contact pins, in accordance with an embodiment of the present invention. Receptacle 205 generally engages the 24-pin connector J1 of connector plug 105, and not the 5-pin connector J2.

The ensuing description refers generically to a first device 100 having a connector plug 105, which attaches to a container 200 having a receptacle 205 for connector plug 105. Device 100 may be, inter alia, a wireless communicator as described hereinabove, a small memory card or a small camera. Container 200 may be, inter alia, a jacket or host for the wireless communicator as described hereinabove, a computer, a cell phone, a camera, a game station or a PDA.

Figure 8:
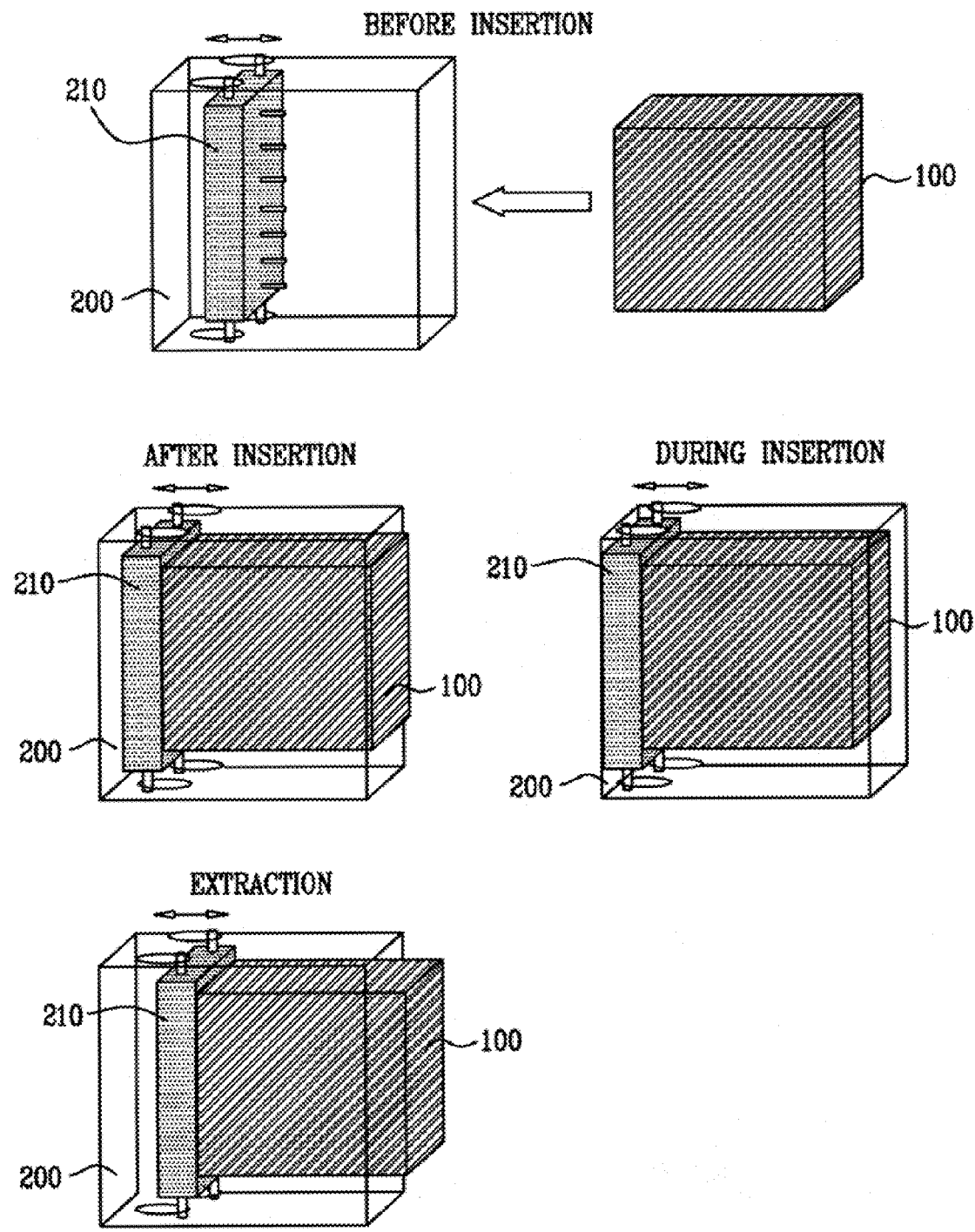
FIG. 8 is a simplified illustration of a device being inserted into and extracted from a container, in accordance with an embodiment of the present invention.

Reference is made to FIG. 8, which is a simplified illustration of device 100 being inserted into and extracted from container 200, in accordance with an embodiment of the present invention. Shown in FIG. 8 are device 100 and container 200 with a slideable bar 210 that slides forward and back within container 200. Device 100 has a connector plug that engages with a receptacle mounted on slideable bar 210. In order to electrically connect device 100 and container 200, the connector plug must engage with contact pins of the receptacle.

Four stages are illustrated in FIG. 8; namely, a first stage prior to insertion of device 100 into container 200, a second stage during insertion of device 100 into container 200, a third stage after insertion of device 100 into container 200, and a fourth stage during extraction of device 100 from container 200. In the first stage, slideable bar 210 is at rest in a retracted position. The first stage is further illustrated in FIGS. 10 and 11, as described hereinbelow.

In the second stage, slideable bar 210 is advanced far into container 200, in response to device 100 being pushed into container 200. The second stage is further illustrated in FIG. 12, as described hereinbelow.

In the third stage, slideable bar 210 has retracted somewhat and is locked in an advanced position. The third stage is further illustrated in FIG. 13, as described hereinbelow.

In the fourth stage, slideable bar 210 is at rest in the retracted position again, and device 100 protrudes outside of container 200. In the fourth stage, the connector plug is still engaged with the contact pins of the receptacle. However, device 100 protrudes far enough out of container 200 such that it can be grasped and pulled out of container 200, thereby disengaging the connector plug from the contact pins of the receptacle. The fourth stage is further illustrated in FIG. 14, as described hereinbelow.

It will be appreciated by those skilled in the art that there are two stationary positions for slideable bar 210; namely, the rest position in stages one and four, and the locked position in stage three. The position in stage two is not a stationary position, and shows slideable bar 210 pushed into container 200 beyond its locked position. As soon as device 100 stops being pushed, slideable bar 210 retracts to its locked position. When slideable bar 210 is in its locked position, device 100 does not substantially protrude out of container 200. When slideable bar 210 is in its rest position, device 100 protrudes out of container 200 such that it can be grasped and pulled.

It will be appreciated by those skilled in the art that whereas conventional connector plugs and receptacles are rigidly fixed, slideable bar 210 provides a "floating" receptacle. A mechanical structure for enabling the floating receptacle, in accordance with an embodiment of the present invention, includes two latches, two springs for applying tensions to the latches, two clips for locking the latches into place, and means for electrically connecting the receptacle pins to an electrical circuit while accommodating movement of the receptacle, as described hereinbelow.

Figure 9:
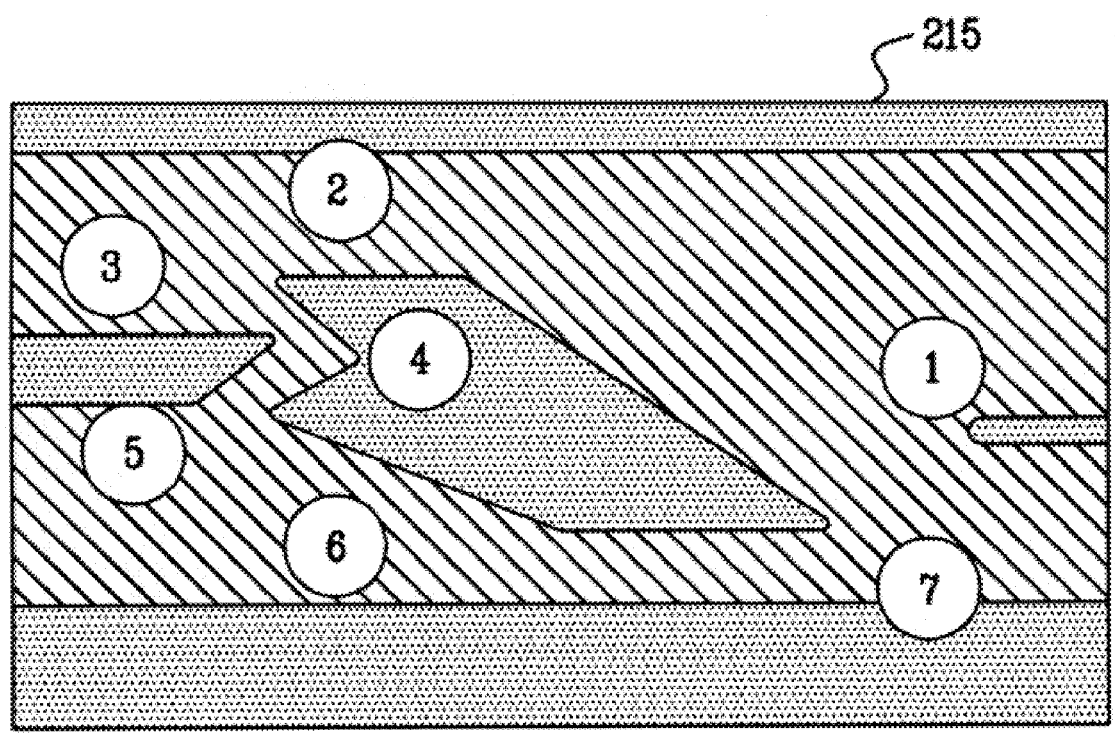
FIG. 9 is a simplified diagram of a grooved latch that controls movement of a slideable bar, in accordance with an embodiment of the present invention.
Figure 9:
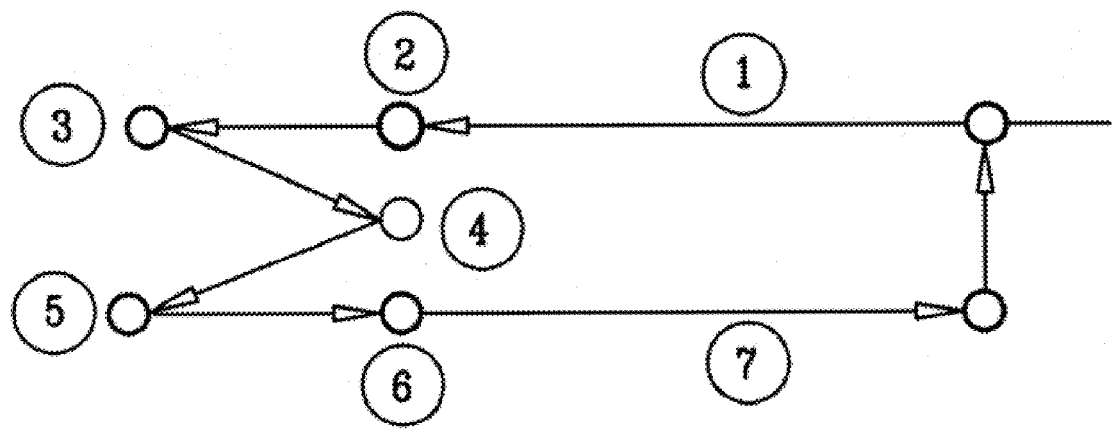

Reference is made to FIG. 9, which is a simplified diagram of a grooved latch 215 that controls movement of slideable bar 210, in accordance with an embodiment of the present invention. As shown below in FIGS. 10-14, a clip is used to lock latch 215 into place, in accordance with an embodiment of the present invention. The end of the clip extends at a right angle into the grooves of latch 215, and catches on the contours of the grooves. When device 100 is pushed into container 200, latch 215 is pushed accordingly, and the contours of the grooves of the latch abut against the clip, raising and lowering the end of the clip.

Two such latches 215 and two such clips are mounted on two opposite sides of the housing, and slideable bar 210 is mounted between the two latches. When latches 215 are pushed forward, they advance alongside of the clips. The clips remain in rigid positions, but tilt at an angle due to the raising and lowering of the ends of the clips by the contours of the grooves in latches 215.

Shown in FIG. 9 are seven locations on latch 215, numbered 1-7. These locations correspond to positions of the end of the clip when device 100 is inserted in container 200 and extracted therefrom. The first stage of FIG. 8 corresponds to the end of the clip being located at position 1. The second stage of FIG. 8 occurs when device 100 is pushed into container 200 for insertion. Latch 215 is pushed accordingly so that the end of the clip is raised to position 2, and then to position 3. The third stage of FIG. 8 occurs when the push force on device 100 is released, and latch 215 retracts so that the end of the clip lodges and locks at position 4, which is a locked stationary position. The fourth stage of FIG. 8 occurs when device 100 is pushed into container 200 for extraction. Latch 215 is pushed accordingly so that the end of the clip is lowered to position 5. When the push force on device 100 is released, latch 215 retracts and the end of the clip moves to position 6 and then to position 7 and then up to position 1, which is a stationary rest position. When the end of the clip rests at position 1, device 100 protrudes out of container 200, and can then be grasped and pulled completely out of container 200.

As noted hereinabove with respect to FIG. 8, slideable bar 210 has two stationary positions; namely, a locked state corresponding to the end of the clip being lodged at position 4 of latch 215, and a rest state corresponding to the end of clip 225 being at position 1 of latch 215.

Figure 10:
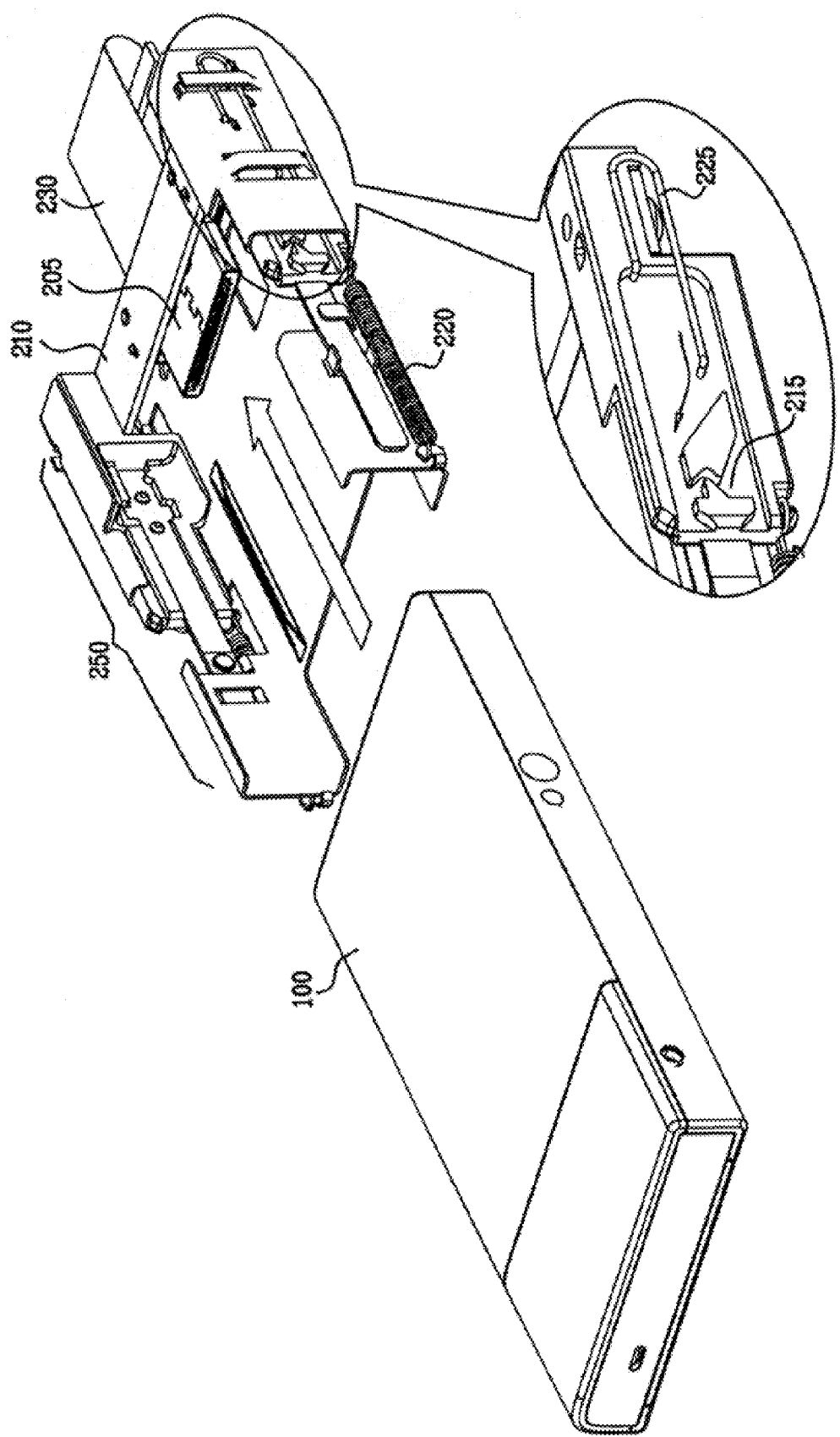
FIG. 10 is an illustration of the slideable bar in its rest state within a chassis, prior to insertion of the device, in accordance with an embodiment of the present invention.

Reference is made to FIG. 10, which is an illustration of slideable bar 210 in its rest state within a chassis 250, prior to insertion of device 100, in accordance with an embodiment of the present invention. The chassis 250 for the wireless communicator shown in FIGS. 4A and 4B is approximately 43 mm wide and 9 mm deep.

Chassis 250 holds two grooved latches 215, two springs 220 and two clips 225 mounted on opposite sides. The two springs 220 attach to respective ones of latches 215, and the two clips 225 lodge in grooves of respective ones of latches 225 to lock them into place. When device 100 is pushed into container 200, latches 215 are pushed accordingly and move to the various positions relative to clip 225 shown in FIG. 9.

Receptacle 205 is attached to a flex 230, which connects the contact pins of receptacle 205 to a printed circuit board (PCB) that is fastened to container 200. Flex 230 accommodates movement back and forth of receptacle 205.

Figure 11:
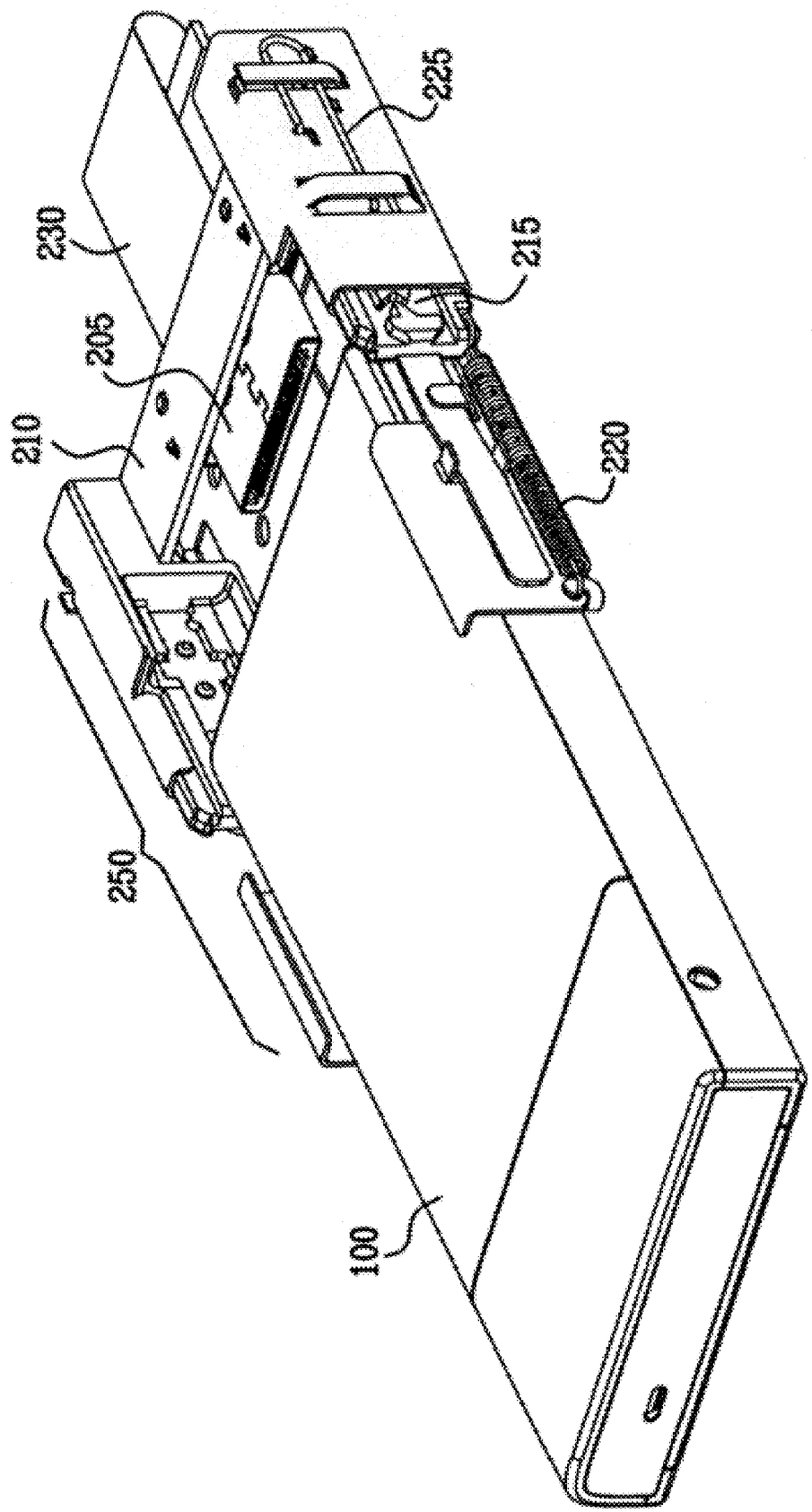
FIG. 11 is an illustration of insertion of the device into the chassis, prior to the connector plug being engaged with the receptacle, in accordance with an embodiment of the present invention.

Reference is made to FIG. 11, which is an illustration of insertion of device 100 into chassis 250, prior to connector plug 105 being engaged with receptacle 205, in accordance with an embodiment of the present invention. FIG. 11 shows device 100 being pushed into chassis 250, along the direction of the arrow shown in FIG. 10. Latches 215 are pushed towards clips 225 accordingly. At the stage illustrated in FIG. 11, the ends of clips 225 are at position 1 of latches 215, as indicated in FIG. 9, and connector plug 105 is not yet engaged with receptacle 205.

Figure 12:
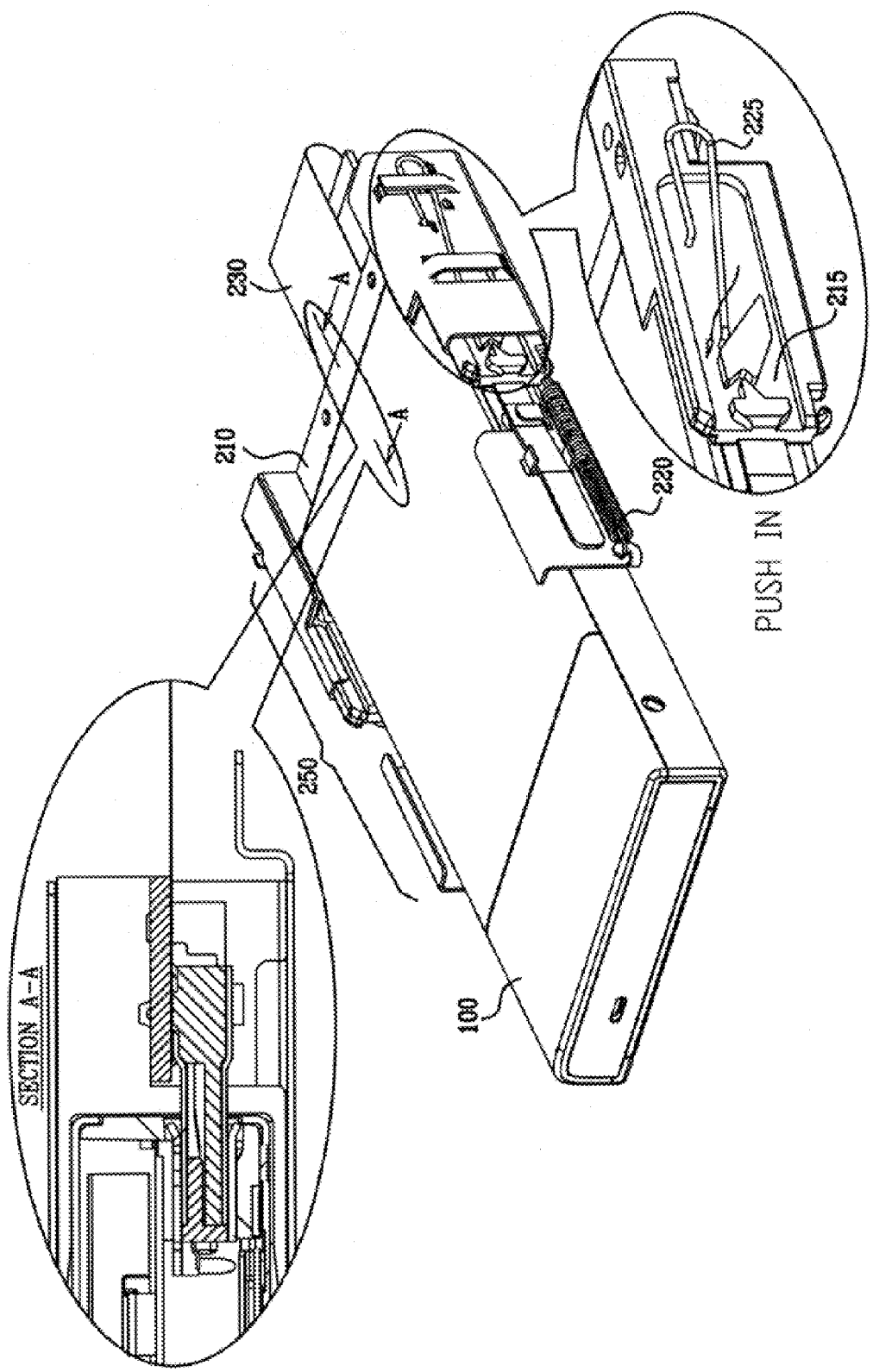
FIG. 12 is an illustration of the device pushed into the chassis, with the connector plug engaged with the receptacle, in accordance with an embodiment of the present invention.

Reference is made to FIG. 12, which is an illustration of device 100 pushed into chassis 250 with connector plug 105 engaged with receptacle 205, in accordance with an embodiment of the present invention. As device 100 is pushed, latch 215 moves so that clip 225 is at position 2 and then at position 3, as indicated in FIG. 9. Whereas clip 225 is horizontally aligned with chassis 250 in FIG. 11, clip 225 is inclined at an angle in FIG. 12.

Figure 13:
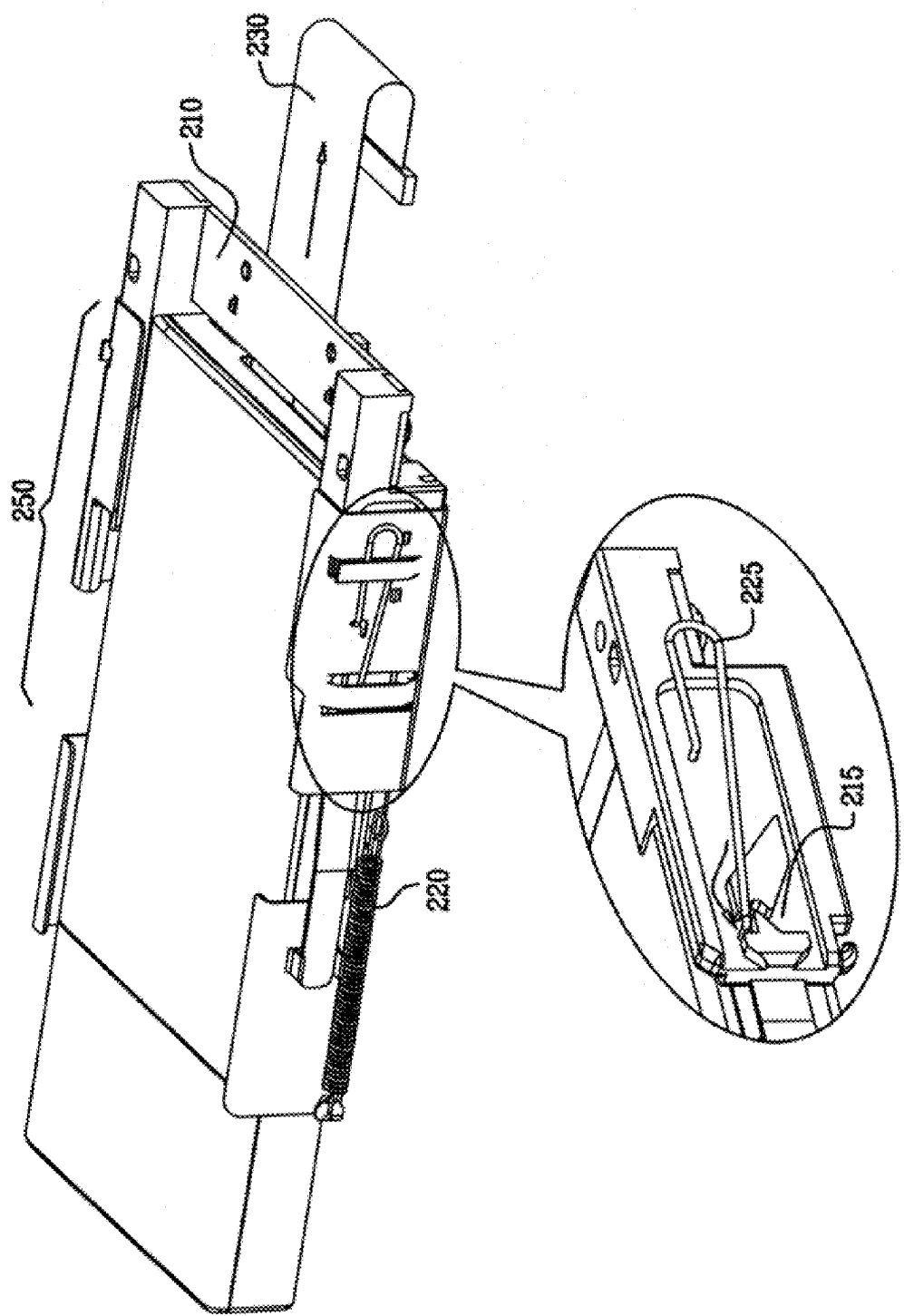
FIG. 13 is an illustration of the latch locked into place by the clip, and the slideable bar in its locked stationary position, in accordance with an embodiment of the present invention.

Reference is made to FIG. 13, which is an illustration of latch 215 locked into place by clip 225, and slideable bar 210 in its locked stationary position, in accordance with an embodiment of the present invention. When the pushing force on device 100 is released, latch 215 retracts under tension of spring 220, and the end of clip 225 lodges into a groove of latch 215, locking it into place. The end of clip 225 is at position 4 of latch 215, as indicated in FIG. 9, and is inclined at an angle.

Figure 14:
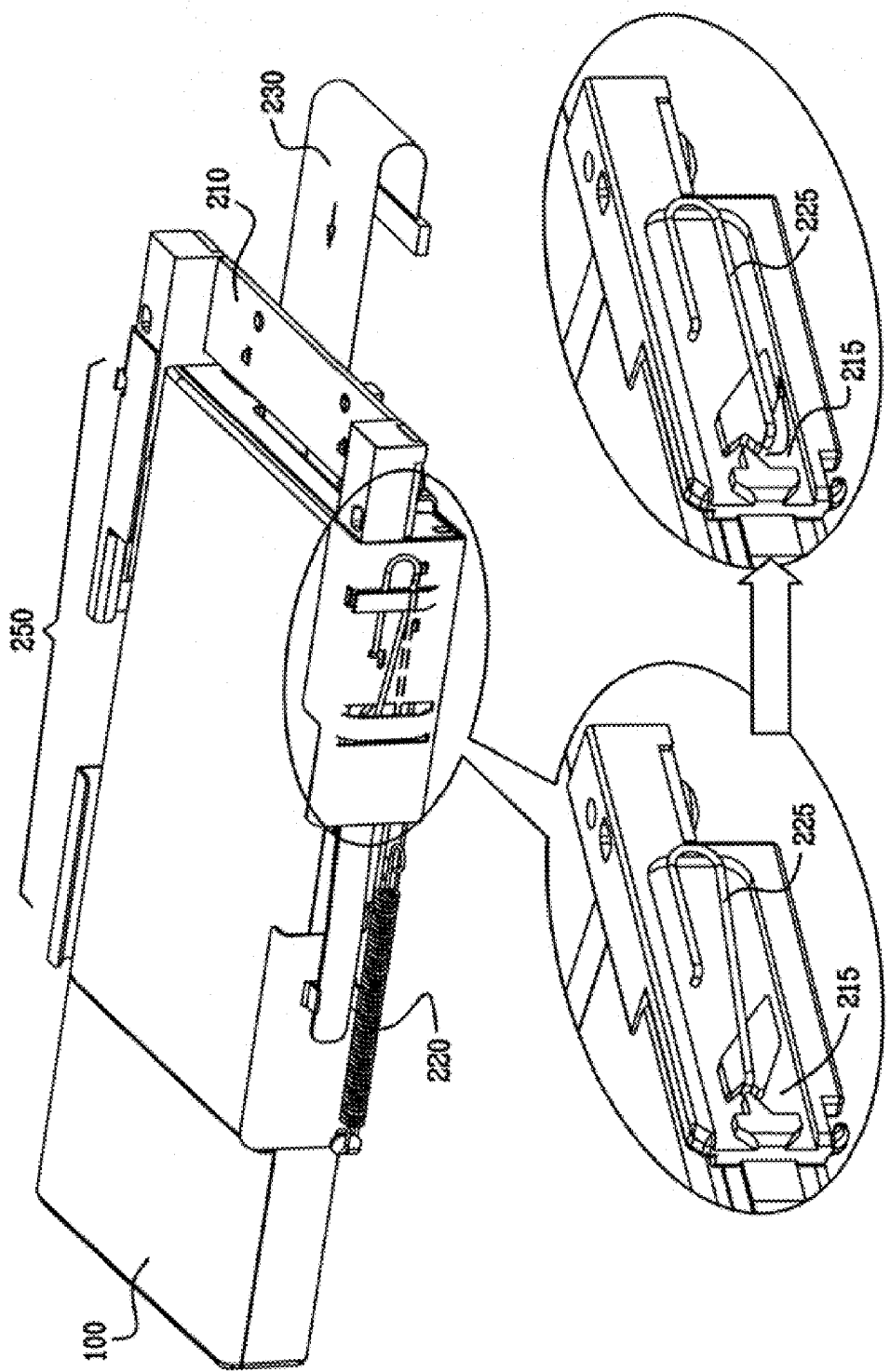
FIG. 14 is an illustration of extraction of the device from the chassis, in accordance with an embodiment of the present invention.

Reference is made to FIG. 14, which is an illustration of extraction of device 100 from chassis 250, in accordance with an embodiment of the present invention. Device 100 is pushed into chassis 250 so that latch 215 moves and the end of clip 225 is released from its lodged position in the groove of latch 215. The end of clip 225 is then at position 5 of latch 215. When the pushing force on device 100 is released, latch 215 retracts under tension of spring 220, and the end of clip 225 moves to position 6 and then to position 7 of the latch. Connector plug 105 is still engaged and in electrical contact with receptacle 205, but device 100 protrudes out of chassis 250, making it possible to grasp and pull on device 100 and thereby disengage connector plug 105 from receptacle 205.

Figure 15:
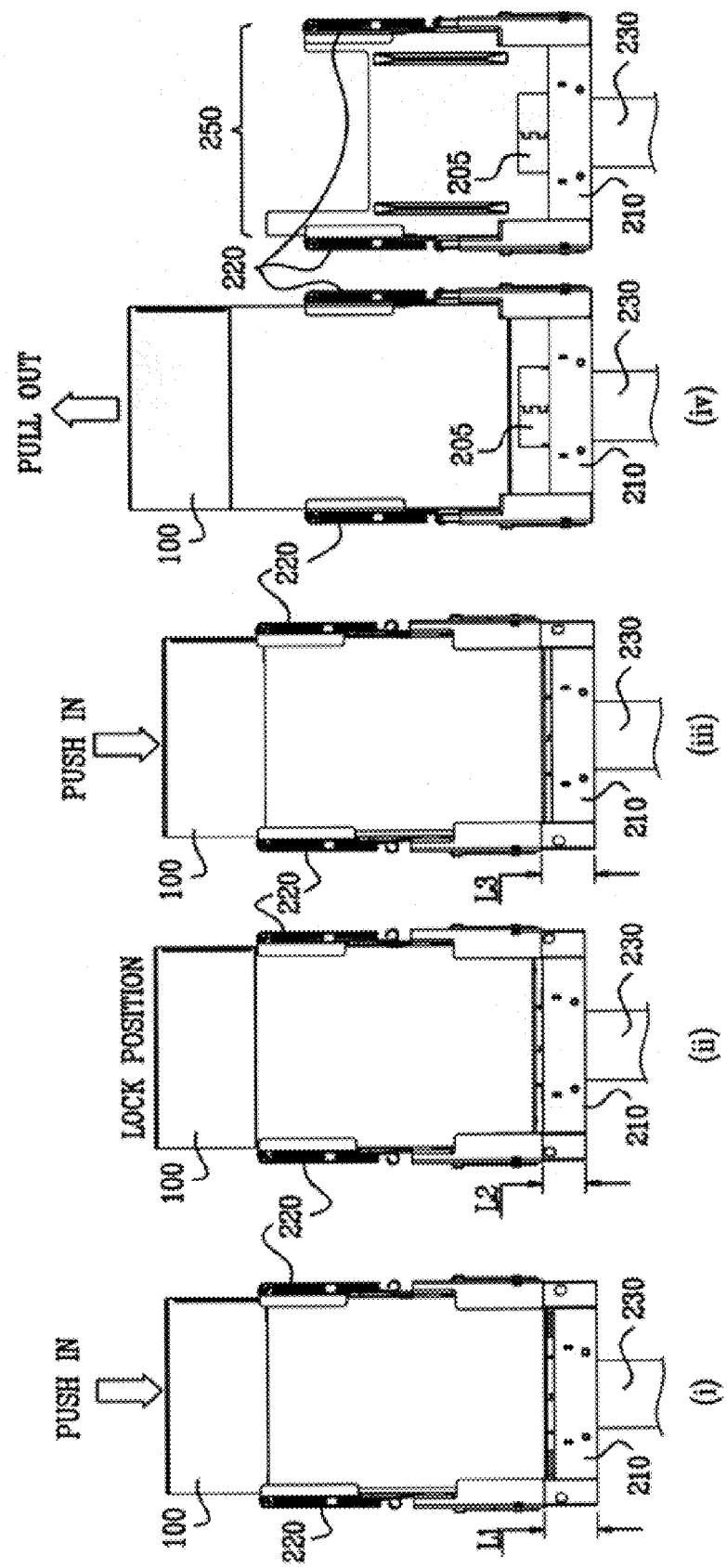
FIG. 15 is a sequence of illustrations of the device (i) being pushed into the chassis for insertion, then (ii) being locked into its locked stationary position, then (iii) being pushed into the chassis for extraction, then (iv) being pulled out for disengagement, in accordance with an embodiment of the present invention.

Reference is made to FIG. 15, which is a sequence of illustrations of device 100 (i) being pushed into chassis 250 for insertion, then (ii) being locked into its locked stationary position, then (iii) being pushed into chassis 250 for extraction, then (iv) being pulled out for disengagement, in accordance with an embodiment of the present invention.

Figure 16:
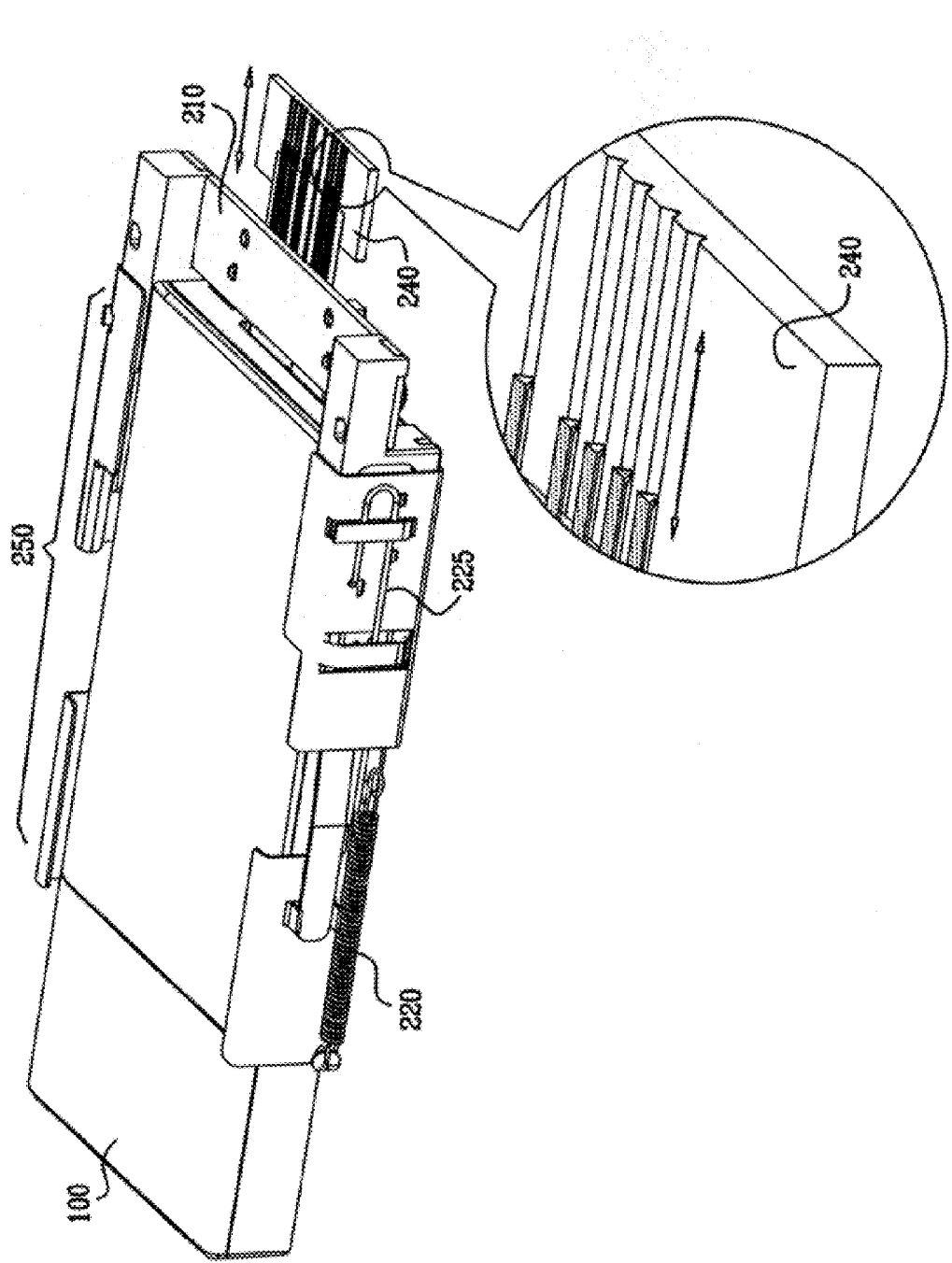
FIG. 16 is an illustration of an alternate embodiment of the present invention, wherein the receptacle is connected to an array of wires instead of to a flex, in accordance with an embodiment of the present invention.

Reference is made to FIG. 16, which is an illustration of an alternate embodiment of the present invention, wherein receptacle 205 is connected to an array of wires 240 instead of to flex 230, in accordance with an embodiment of the present invention. As receptacle 205 advances and retracts, it slides forward and back along wires 240 all the while maintaining electrical contact between the pins of receptacles 205 and the PCB of container 200.

It will thus be appreciated by those skilled in the art that the "push-to-insert, push-to-eject and pull-to-extract" embodiment of the present invention offers many advantages. It yields reduction in length of device 100. It allows for continued operation of devices 100 and 200 during ejection, since connector plug 105 is still engaged with receptacle 205 during the "push-to-eject" movement. It also provides an early warning that the user is removing device 100 from device 200, prior to the "pull-to-extract" movement.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. An assembly for a receptacle for an electrical connector plug, comprising:
    a chassis for inserting an electrical connector plug therein;
    two slideable grooved latches mounted on two opposite side surfaces of said chassis, that slide along the two opposite sides under applied force, each slideable grooved latch comprising grooves that provide latching functions, the grooves being formed on oppositely facing outward surfaces of the grooved latches;
    two springs fastened to respective ones of said two slideable latches, mounted on the two opposite side surfaces of said chassis;
    a bar mounted between and coupled with said two slideable latches; and
    a receptacle for the connector plug, mounted on said bar and comprising a plurality of contact pins for electrical contact with the connector plug,
wherein (i) said two slideable latches are pushed away from respective ones of said two springs, causing said two springs to stretch and to exert tensions thereon, when the connector plug is pushed into said receptacle, and (ii) said two slideable latches are pulled towards respective ones of said springs, when the connector plug is extracted from said receptacle.

2. The assembly of claim 1 wherein the stretched positions of said two springs when the connector plug is pushed into said receptacle, are approximately 8 mm longer than their unstretched positions.

3. The assembly of claim 1 further comprising two clips, mounted on the two opposite side surfaces of said chassis, which lodge into grooves of respective ones of said two slideable latches thereby locking them from retracting under the tensions exerted thereon by respective ones of said two springs.

4. The assembly of claim 3 wherein said two clips incline at an angle relative to respective ones of said two slideable latches when said clips lodge into grooves of said latches.

5. An assembly for a receptacle of an electrical connector plug, comprising:
    a chassis for sliding an electrical connector plug therein;
    two slideable latches mounted on two opposite side surfaces of said chassis, that slide along the two opposite side surfaces under applied force, each slideable grooved latch comprising grooves that provide latching functions, the grooves being formed on oppositely facing outward surfaces of the grooved latches;
    a bar mounted between and coupled with said two slideable latches; and
    a receptacle for the connector plug mounted on said bar, comprising a plurality of contact pins for making electrical contact with the connector,
wherein (i) said slideable latches advance along the two opposite side surfaces of said chassis when the connector plug is pushed into said chassis for insertion into said receptacle, and (ii) said slideable latches advance and then retract along the two opposite side surfaces of said chassis when the connector plug is pushed into said chassis for extraction from said receptacle.

6. The assembly of claim 5 wherein said bar locks in a first position after the connector plug is pushed for insertion, and rests in a second position after the connector plug is pushed for extraction, the second position being different than the first position.

7. The assembly of claim 6 further comprising two clips, mounted on the two opposite side surfaces of said chassis which, when lodged into grooves of respective ones of said two slideable latches, lock said bar in the first position.

8. The assembly of claim 6 wherein the distance between the first position and the second position is more than 5 mm.

9. The assembly of claim 6 further comprising:
    a printed circuit board; and
    a flex attached to said receptacle, for accommodating movement of said receptacle while connecting said receptacle contact pins to said printed circuit board.

10. The assembly of claim 6 further comprising:
    a printed circuit board; and
    an array of wires attached to said receptacle, for accommodating movement of said receptacle while connecting said receptacle contact pins to said printed circuit board.

11. A system comprising:
    a device comprising an electrical connector plug; and
    a container for the device comprising:
        a container housing with a cavity for inserting said device therein, such that said device is fully enclosed by the container;
        two moveable latches mounted on two opposite side surfaces of said housing, that move relative to the housing under applied force, each moveable latch comprising grooves that provide latching functions, the grooves being formed on oppositely facing outward surfaces of the moveable latches;
        a bar mounted between and coupled with said two moveable latches; and
        a receptacle for said connector plug, mounted on said bar, comprising a plurality of contact pins for making electrical contact with the connector plug,
    wherein (i) said moveable latches advance to allow said device to sit fully within the cavity when said device is pushed into said container for insertion of said connector plug into said receptacle, and (ii) said moveable latches advance and retract such that said device extends out of the cavity and may be pulled for release from said receptacle when said device is pushed into said housing for extraction of said connector plug from said receptacle.

12. The system of claim 11 wherein said bar locks in a first position after said device is pushed into said container for insertion of said connector plug into said receptacle, and rests in a second position after said device is pushed into said housing for extraction of said connector plug from said receptacle, the second position being different than the first position.

13. The system of claim 11 wherein said connector plug is in electrical contact with said receptacle when said bar is locked in the first position and also when said bar is resting in the second position.

* * * * *